W. E. BOBO.
CURING SWEET POTATOES OR YAMS.
APPLICATION FILED APR. 17, 1920.

1,353,561. Patented Sept. 21, 1920.

Witness:
R. L. Farrington

Inventor:
Walton E. Bobo
by Albert Scheith
Attorney

UNITED STATES PATENT OFFICE.

WALTON E. BOBO, OF HATTIESBURG, MISSISSIPPI, ASSIGNOR TO THE MAGNOLIA COMPANY, OF CHICAGO, ILLINOIS, A CORPORATION OF DELAWARE.

CURING SWEET POTATOES OR YAMS.

1,353,561.   Specification of Letters Patent.   Patented Sept. 21, 1920.

Application filed April 17, 1920. Serial No. 374,594.

*To all whom it may concern:*

Be it known that I, WALTON E. BOBO, a citizen of the United States, residing at Hattiesburg, Mississippi, have invented certain new and useful Improvements in Curing Sweet Potatoes or Yams; and I do hereby declare the following to be a full, clear, and exact description of the invention, such as will enable others skilled in the art to which it appertains to make and use the same.

My invention relates to methods of treating vegetables to prevent the same from spoiling, and more particularly to the treating of sweet potatoes and yams. This class of vegetables differs from the common potatoes, and from most other vegetables in that a part of the moisture content comes to the surface as a sweat and causes a rotting of the vegetables unless this moisture has first been reduced to a suitable extent. This can be done by subjecting such vegetables to a curing process before storing them. In the absence of such a curing treatment, sweet potatoes or the like cannot be stored for any considerable length of time, nor can they be shipped for any distances without spoiling a considerable proportion of the same. Consequently, it was formerly necessary for the growers to dispose of such vegetables very quickly after they ripened in the fall, thereby flooding the market during a short season and making it impossible for the growers to receive the higher prices which could be obtained if the vegetables were sold during a period of many months. Moreover, the proper consumption of such vegetables could be stimulated in localities at a distance from the points where they are grown.

To overcome this handicap which has been commercially serious to the sweet potato growers, it has recently become customary to some extent to store such vegetables in storage houses in which they were initially subjected to a temperature sufficient for drying off the excess moisture, and in which the temperature is afterward maintained at a temperature suitable for storage. For example, the Government in one of its so-called "Farmers' Bulletins" has recommended maintaining a temperature in such a storage house at from 80 to 85° F. while the vegetables are brought in and for some ten days or two weeks after that time, and thereafter maintaining it at 54 or 55° through the winter.

While such a so-called curing has greatly reduced the spoiling of the vegetables, it has still led to the discoloring and spoiling of a considerable portion of the same and to an undue loss of weight, which loss is particularly undesirable since such vegetables are now commonly retailed by weight. For example, I have found that when the freshly dug sweet potatoes or yams are subjected immediately to a temperature of even 76°, the moisture is driven off too rapidly, so that the vegetables are discolored and overcured and lose a greater amount of weight than is really necessary for preparing them so that they may be stored indefinitely. This deleterious action is all the more serious when the temperature in the curing or storage plant is maintained at from 80 to 85° as has been customary in compliance with instructions from the Government, so that this practice has resulted in still leaving a considerable proportion of the vegetables either entirely spoiled or at least so discolored as to command a much lower price.

Generally speaking, my invention aims to provide an improved process or method of treating vegetables of this class in such a manner as to reduce the amount of shrinkage and to positively avoid both a discoloring and an overcuring of the same. It also aims to provide a treatment which will permit the curing of the larger vegetables without overcuring or injuring smaller ones mixed with the same. Still further objects will appear from the following specification and from the accompanying drawings, in which—

Figure 1:
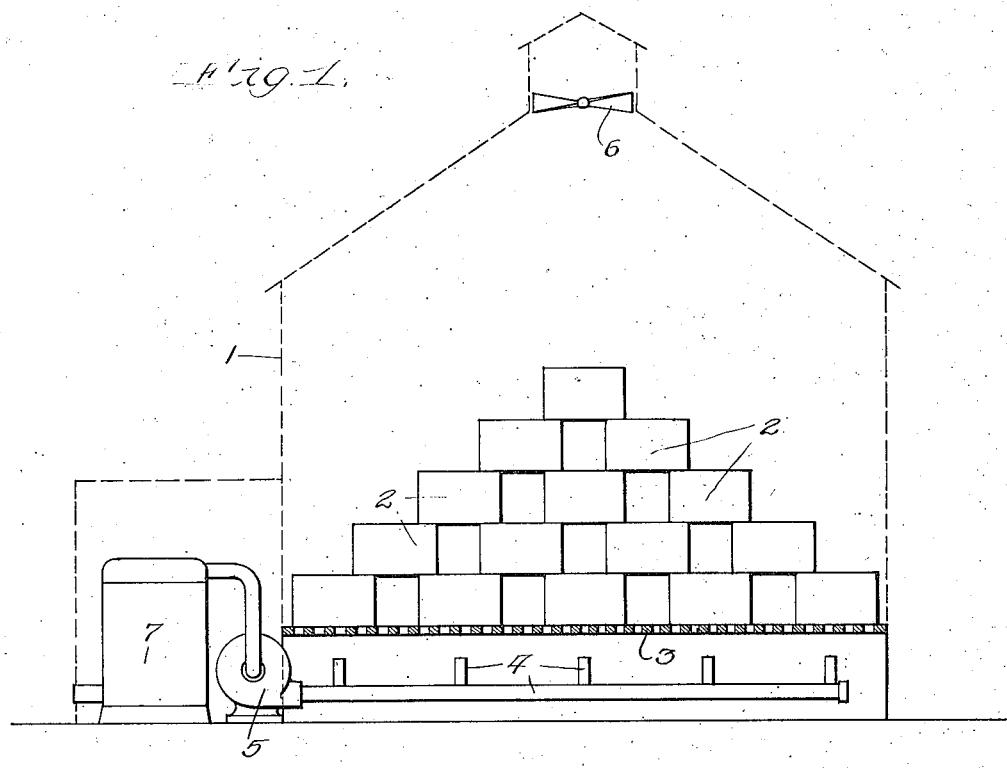
Figure 1 is a somewhat diagrammatic view showing a vertical section through a curing and storage plant equipped for carrying out the process of my invention.

In carrying out my invention, the vegetables are brought into a suitable storage room, which is here illustrated rather diagrammatically as a single room forming the major portion of a storage house 1. For this purpose, they are desirably brought in as soon as possible after they have been dug out of the ground, and to save handling, they are desirably brought into the house when already sorted out as to sizes and when already packed in crates or hampers of the type used for shipping such goods. These crates 2 are stacked in the curing and storage room of the building, and while they are brought in, the air in the curing room is maintained substantially at the outdoor temperature, which at the time of the year when such vegetables ripen is usually between 40 and 70°. Then the temperature in the room is maintained at this initial outdoor temperature for two or three days while the vegetables are subjected to currents of air passing upward through the crates. For this purpose, the floor 3 of the curing room is here indicated as of a perforated or grate construction, and the air is supplied through a number of outlets 4 by a power-driven blower 5. Moreover, if the barometer is low, the movement of the air through the crates and between the vegetables may be accelerated by means of an exhaust fan 6 in the ceiling of the room.

This initial aerating of the vegetables drives off the surface moisture which adheres to the vegetables when they are first dug and prepares them for the curing period of the process. The temperature is then gradually increased to about 76° by suitably warming the air supply (as for example through a furnace 7), an upward movement of the air through the crates (and hence around the individual vegetables) being continuously maintained, so as to carry off any moisture exuding from the vegetables. This raising in temperature is desirably very gradual, as for example at the rate of 5 to 10° per twenty-four hours. Then the room temperature is maintained constant at approximately 75° for about a week while the blower or exhaust fan, or both, are manipulated so as to maintain a continuous and gentle circulation of the air over and around the vegetables.

Figure 2:
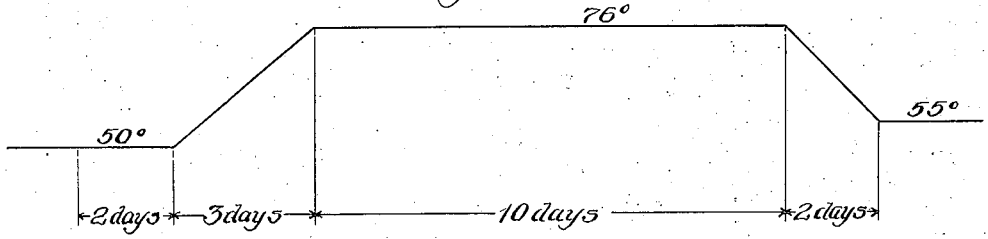
Fig. 2 is a diagram showing a suitable schedule of temperatures as employed according to my invention in the curing of yams or sweet potatoes when these are all of substantially uniform size.
Figure 3:
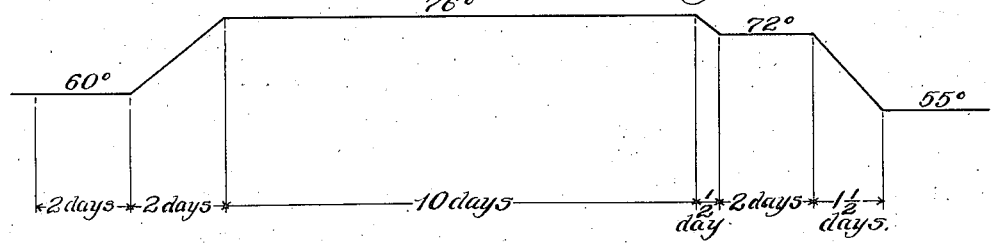
Fig. 3 is a similar diagram showing a modification of the temperatures as employed when the vegetables vary considerably in size.

This temperature, which is here given as approximately 76°, is that required for an effective removal of the excess of moisture which would cause the vegetables to deteriorate if not removed from the same, and is sometimes referred to as "a sweating temperature". Both the temperature and the time required for this purpose may vary according to various factors, such as the species of vegetables, the climatic conditions under which they were grown, and the size of the same. Where the sweet potatoes or other vegetables thus treated are all of substantially the same type and size, the same length of time should answer for all of them and the completion of the period can readily be seen from the appearance of tiny sprouts on the surface of the potatoes. As soon as this occurs, which is usually in the course of a week or ten days, the temperature in the curing house is gradually reduced to about 55° and may then be continued indefinitely at this point, as the cured sweet potatoes will keep from one season to another at such a temperature.

Where the vegetables are of mixed sizes, the curing is completed earlier for the smaller ones than for the larger ones, and if all were left exposed to the main curing temperature of 76°, the sprouts on the smaller vegetables would deteriorate the same. With such mixed batches I therefore reduce the temperature to about 72° as soon as the sprouts appear on the smaller ones and continue this somewhat reduced temperature for a day or two, thereby completing the curing of the larger vegetables without injuring the smaller ones. In that case, the temperature schedule may desirably be as shown on the diagram of Fig. 3, while for vegetables of uniform size the schedule diagram is somewhat simplified as in Fig. 2.

By employing the process as above described, I have found that I can cure sweet potatoes and yams thoroughly and uniformly (provided that they were not initially damaged) so that they can readily be kept in the storage house from fall until spring, and have also found that I can secure this highly desirable result without either the discoloration or the excessive shrinkage in weight resulting from the methods heretofore employed. Moreover, since the natural draft on clear days may be ample for producing the required air circulation, the amount of power required for moving the air is very small, so that the main expense is that required for warming the building to the desired temperature. In practice, this heating, as well as the cost of the attendance and the interest on the investment, represent only a small total amount in proportion to the increased market value of the vegetables in the spring as compared with their price in the fall, so that I enable the growers to secure decidedly higher returns, and also enable them to satisfy the demand for such vegetables during a larger part of the year.

However, while I have illustrated and described my invention as employed in a simple plant having a single room and as applied to the curing of sweet potatoes or yams, I do not wish to be limited to these or other details as above disclosed, it being obvious that they might be varied in many respects without departing from the spirit of my invention. For example, my method may advantageously be employed in connection with the curing and storing plants disclosed in the copending application #374,744 as filed by Henry W. Graves on April 17, 1920.

I claim as my invention:

1. The method of curing sweet potatoes or the like, which includes aerating the same initially at substantially atmospheric temperature to remove the surface moisture; gradually raising the temperature to that required for "sweating" the potatoes and for curing the same; maintaining this temperature until there are indications of sprouting, and thereafter gradually reducing the temperature to that suitable for permanent storage.

2. In the curing of sweet potatoes or the like, the successive steps of subjecting the same to surface-drying-air currents at substantially atmospheric temperature, raising the temperature gradually to about 76° F., maintaining the temperature until there are indications of sprouting, and thereafter gradually reducing the temperature to about 55°.

3. In the curing of sweet potatoes or the like, the successive steps of initially subjecting the sweet potatoes to air currents at substantially atmospheric temperature for approximately two or three days; gradually raising the temperature to 76° F. and maintaining an air circulation at this latter temperature for approximately a week or ten days, and finally reducing the temperature to about 55°.

4. In the curing of sweet potatoes or the like, the successive steps of subjecting the sweet potatoes to air currents at a temperature of between 40° and 70° and for a sufficient length of time to dry off the surface moisture, gradually raising the temperature of the air to which the sweet potatoes are subjected to about 76° and maintaining the air at this temperature until the smaller potatoes indicate signs of sprouting, reducing the temperature to about 72° and maintaining it there for a relatively shorter period, and thereafter gradually reducing the temperature to about 55°.

5. In the curing of sweet potatoes or the like, the subjecting thereof to substantially the following temperature conditions: first, for from two to three days to the outer atmospheric temperature at which they were brought in, then to temperatures raised at the rate of 5 to 10° per day up to 76°, then to temperature sustained at 76° for about a week or ten days, and thereafter to a temperature gradually lowered to about 55°.

Signed at Hattiesburg, Mississippi, April 13th, 1920.

WALTON E. BOBO.